No. 872,949. PATENTED DEC. 3, 1907.
J. MACHTOLF.
PROCESS FOR THE PRODUCTION OF AMORPHOUS CARBON.
APPLICATION FILED MAR. 9, 1907.
2 SHEETS—SHEET 2.
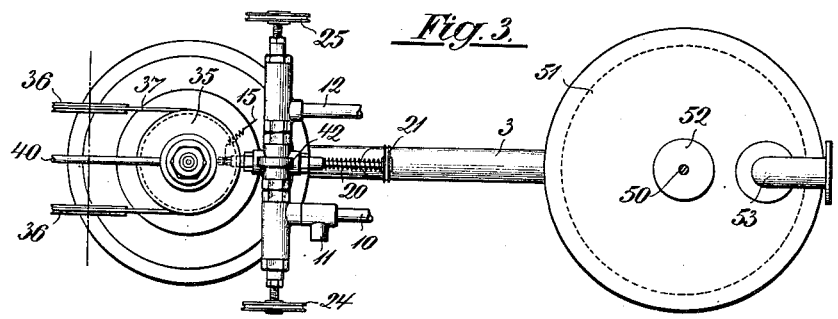
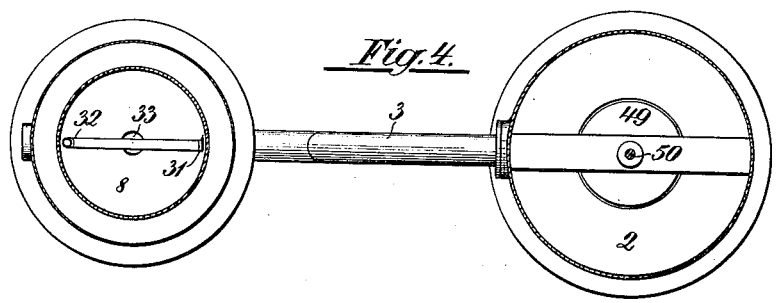
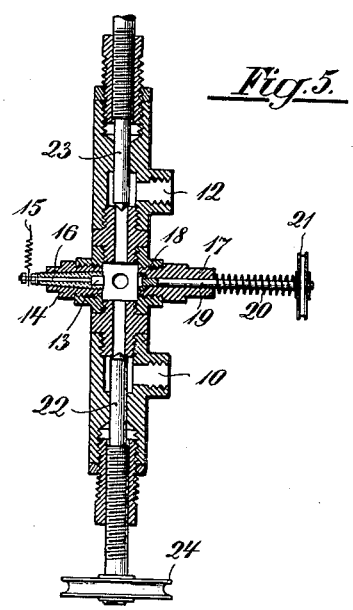
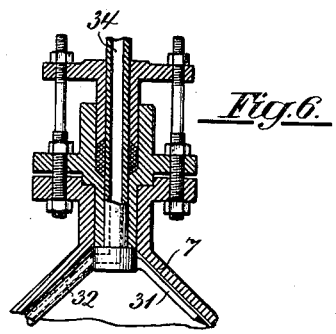
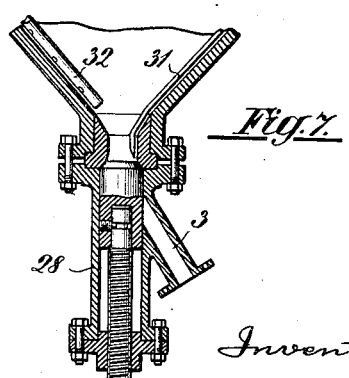
Witnesses:
Inventor:
Josef Machtolf

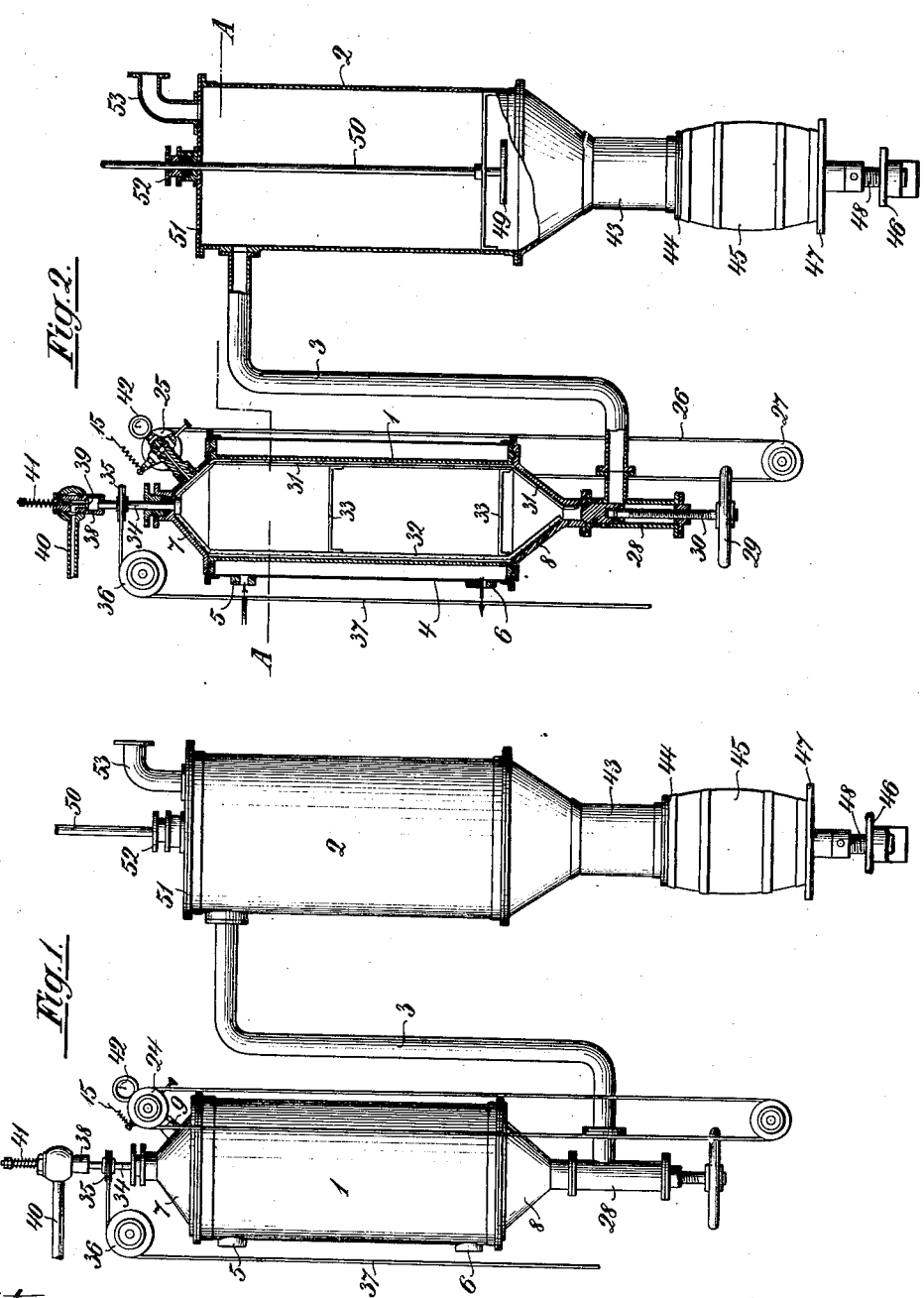

UNITED STATES PATENT OFFICE.

JOSEF MACHTOLF, OF BÖBLINGEN, GERMANY.

PROCESS FOR THE PRODUCTION OF AMORPHOUS CARBON.

No. 872,949.　　　　　Specification of Letters Patent.　　　　Patented Dec. 3, 1907.

Application filed March 9, 1907. Serial No. 361,548.

*To all whom it may concern:*

Be it known that I, JOSEF MACHTOLF, a subject of the King of Würtemberg, residing at Böblingen, in the Kingdom of Würtemberg, Germany, have invented certain new and useful Improvements in a Process for the Production of Amorphous Carbon; and I do hereby declare the following to be a full, clear, and exact description of the invention, such as will enable others skilled in the art to which it appertains to make and use the same.

In the prior art, lampblack has been produced by the explosion of acetylene, either *per se* or in admixture with other bodies, such as air, heightening its explodibility. A very high temperature however is developed in the explosion of acetylene and the carbon produced is consequently rather dense and hard, making it not well suited for manufacturing printers' ink and like purposes. In making ink it is also found to have a tendency to swell, which is objectionable. Further, acetylene being usually free from oily bodies and the explosion temperature as stated, being high, the black does not contain hydrogenated bodies found in the usual gas and oil blacks, which would contribute to diminish its hardness and to cause it to give gloss in lithographic printing. In practice the acetylene processes have also been found rather difficult and dangerous because of the abnormally high pressures developed in the explosion.

I have found that normally non-explosive carbon-rich hydrocarbon bodies, such as are found, for instance, in the various gases resulting from destructive distillation of oils, coal, etc., can also be exploded if previously heated to a proper temperature. As these bodies are only very slightly endothermic and in practice usually even contain exothermic substances, the explosion temperatures are not high and the carbon produced is soft and glossy. Heating and pressure I find are in some degree reciprocal and by putting the gases to be exploded under some degree of initial pressure, the heating necessary may be reduced. By suitable use of heat and pressure and regulation of the composition of the gas, the temperature developed by explosion can be regulated as desired and thereby the characteristics of the black produced, enabling the production of blacks for such diverse purposes as India ink, ink, pencils, varnishes, arc carbons, and so forth. An addition of the highly endothermic acetylene, which develops much heat on decomposition, or an addition of air may be made to raise the temperature produced by explosion or to facilitate the explosion of the gases at lower initial temperatures and pressures. As a suitable hydrocarbon, oil gas may be employed, but, as already stated, any similar hydrocarbon, such for instance as coal gas, gas from raw naphtha and the like may also be easily divided, that is reduced to carbon and hydrogen.

As before stated the oil gas or other hydrocarbon exploded must be previously heated to a certain definite temperature before explosion. This heating may be done in various ways, one such way is to heat the explosion chamber by the explosion therein of readily explodible mixtures containing acetylene air or the like. As the temperature of the chamber rises, the proportion of admixture of other bodies with the oil gas may be gradually reduced until finally substantially pure oil gas alone is used.

The explosion may be caused by means of the electric spark, by a fulminate or in any other like manner. A convenient method is to provide in proximity to the explosion chamber a small priming change of acetylene or a mixture of gas and air. On detonating this by a spark or the like, the explosion is propagated by the oil gas in the explosion chamber proper.

According to another modification of the process the previous heating of the oil gas can be effected by heating the explosion apparatus with super-heated steam and at the same time regulating the initial pressure so that an explosion will take place. In consequence of the heat liberated by the explosion the steam used for the previous heating will be still further heated, which brings the advantage that the initial pressure used may be diminished. After the explosion has taken place the divided carbon is collected in a receptacle from which it is filled into barrels.

The obtaining of the carbon is accompanied by the utilization of the liberated hydrogen, which latter can be drawn off from the receptacle into a special container. The steam necessary for the preliminary heating of the explosion apparatus can also be obtained in various ways; for instance it can be obtained by bringing a mixture composed of acetylene and oil gas to explosion and using the heat thus liberated for the heating of a water jacket arranged around the explosion apparatus.

A further advantage of this process consists in making the hydrogen useful for the obtaining of by-products such as ammonia.

The above described process takes place with entire exclusion of air, perfectly harmlessly and results in no dust and smell. It should further be remarked that according to the present process it is possible not only to produce enormous quantities of carbon with a small amount of labor, but it is also possible to produce the carbon in any desired condition; moreover the production costs are far smaller than hitherto. Exact calculations have shown that the oil gas carbon is six times as cheap as acetylene carbon and is nevertheless better than the same. Experiments which have been made by experts have further shown that a carbon which for instance has been produced from 60% oil gas and 40% acetylene is 1,034 times specifically lighter than acetylene carbon or in other words, its weight relative to the latter is in the ratio of about 0.968 to 1. The oil gas carbon is much more finely divided than acetylene black and therefore is softer, wherefore it does not swell up when ground for the production of printers' ink, and moreover it can be very easily mixed with water, which with acetylene carbon is not immediately the case.

In the accompanying drawing is illustrated an apparatus by way of example suitable for the carrying out of this process.

In these drawings, Figure 1 shows a view of the dividing apparatus together with the collector. Fig. 2 a longitudinal section thereof. Fig. 3 a view from above. Fig. 4 a horizontal section on the line A—A of Fig. 2. Fig. 5 a section through the gas inlet head. Fig. 6 a section through the stuffing box of the agitator. Fig. 7 a section through the lower closing valve of the dividing apparatus.

The apparatus consists of the dividing cylinder 1 and the carbon collector 2 which stand in communication with one another by means of the tube 3. In the dividing cylinder 1 the hydrocarbon gas is decomposed into carbon and hydrogen and the carbon separating itself as lamp black is conveyed to the collector 2. The dividing cylinder 1 formed of cast steel is provided as shown in Figs. 2 and 4 with a hollow jacket 4, which is intended for the reception of the oil, water or steam used for the preliminary heating. For this purpose there is placed at the upper part of the jacket 4 a projection 5 which acts either as a steam inlet or as oil outlet and the projection 6 at the lower part of the jacket serves in like manner either as a steam outlet or an oil inlet.

At the top the dividing cylinder is closed by means of a cast steel cover 7 and underneath it is closed by a similar cast steel bottom 8. To the cover 7 there is attached the gas inlet head 9 which as shown in Figs. 3 and 5 serves to carry on the one hand the ignition device and on the other hand the gas inlet and outlet valves. The oil gas serving for the preparation of the lamp black is supplied through the projection 10, and through the projection 11 the mixing gas (acetylene, air, or the like) is introduced. Through the projection 12 the hydrogen formed on the decomposition is removed. The projections 10, 11 and 12 are capable of being closed by the valves 22, 23 which can be effected by means of the wheels 24, 25. As these wheels are placed at a considerable height they are preferably connected by means of the strap 26 with an easily reached wheel 27 (see Figs. 1 and 2). The ignition device consists of the ignition electrode 13 placed in a projection 14 provided with electric current 15, which electrode is surrounded by an insulating box 16, a construction similar to that employed with gas engines.

In order to be able to cleanse the ignition device and the insulating box when required, there is provided in front thereof in the part 17 a spindle 19 placed in the front part 18. This spindle 19 stands under the pressure of a spring 20 and is operated by means of a wheel 21. The wheel 21 can be connected by means of a strap with a second wheel so that the cleansing can take place from any point.

The spindle 19 has two purposes; on the one hand by pressing it in and then releasing it, the first spark or the first explosion is obtained. This manipulation is necessary several times until a deposit of carbon has taken place in the insulating box 16 which stops the inflow of the gases. This deposit now causes a short-circuit and the spark is produced as soon as the current circuit is closed. In this manner there is formed a veritable spark producer. On the other hand the spindle, as already stated, serves for cleaning the insulating box, if it should happen that too much lamp black is collected in this apparatus, in which case the current would pass over without sparking. This accident, however, can very rarely happen because by the inrush of the gases the lamp black is always carried with them. The gas head 9 is further provided with a pressure gage 42 in order to indicate the gas pressure at all times. On the projection 28 of the base 8 there is a closing valve 30 provided with a wheel 29 which valve has for its purpose to interrupt the connection with the collector 2 during the decomposition of the hydrocarbon gas. In Fig. 7 this lower part is illustrated on a larger scale.

Within the dividing cylinder 1 there is placed a stirrer which serves to prevent any fixing of the lamp black formed by the decomposition of the hydrocarbon gas on the cylinder walls. The stirrer consists as to one half of a blade 31 fitting close to the cylinder wall, and as to the other half of a steel tube 32 provided with holes (Figs. 2, 4, 6, 7). The stirrer is strengthened by crossbars 33. The actuation of the stirrer is effected by means of the wheel 35 placed upon the hollow axle 34 which wheel can also be operated from below by means of a wheel 36 and a strap 37. Upon the hollow axle 34 there is a revoluble valve body 38 (Fig. 2) which possesses a spring back pressure valve 39 and a projection 40, which serves for the introduction of hydrogen and can be placed in communication with the same hydrogen container as the outlet piece 12.

In order to insure constantly that the valve 39 is closed before the division of the hydrocarbon gas is undertaken, it is advisable to provide the back pressure valve 39 with a lever for the compulsory motion thereof, so that hydrogen passing through the part 40 will not have opposed to it an insuperable obstacle by means of the spring 41. The back pressure valve 39 is formed as a conical valve on which the piece 40 can radially move.

In the collector there is, as stated, the lamp black gathered from the dividing cylinder 1. In order to facilitate the removal of this black it is advisable to make use of the apparatus shown in Figs. 1 and 2. Beneath the prolongation 43 of the container 2 there is pressed by means of the rubber plate 44 a soot catcher 45, which can be worked with a pressure plate 47 provided with countersupport 46 and the spindle 48.

The compression of the lamp black in the barrel 45 takes place by means of a piston 49, the rod 50 whereof passes through a stuffing box 52 secured above to the cover 51 of the receptacle 2. The actuation of the piston can take place by means of a suitable transmission device from any convenient point. To the cover 51 of the receptacle 2 there is attached a tube 53 which stands in connection with a dust collecting device not shown in the drawing.

The operation of the apparatus described is as follows: On the use of oil gas with acetylene or the like, the hollow jacket 4 is filled with gas oil and the tube brought into connection with the oil gas producer so that the previously heated oil can flow through the projection 5 while there is introduced through the projection 6 so much cold oil that the dividing cylinder 1 always maintains desired temperature. Before, however, the first explosion is brought about there is admitted through the projection 10 as much oil gas into the apparatus until all the air is driven out. The valve 30 is then closed and through the projection 11 acetylene gas under a pressure of about four atmospheres is introduced into the dividing cylinder. Then the valve 22 connected to the gas head is closed and the mixture of gas which is now in the cylinder 1 is brought to explode by means of the ignition device 13, whereupon the mixture of oil gas is decomposed into carbon and hydrogen. The valve 23 is then opened and the liberated hydrogen is drawn off into a gas holder (not shown) through the connection 12. This gas holder is composed of a closed vessel which may suitably have the same capacity as the dividing cylinder so that in the dividing cylinder and in the hydrogen holder the same pressure prevails. The hydrogen valve 23 is then closed and the stirrers 31, 32 of the collecting vessel 2 are set in motion. While the stirrers are in operation the valve 30 is opened, whereby the hydrogen still remaining in the cylinder 1 drives the carbon that is to say the lamp black, into the collector 2. As soon as the pressure in the cylinder 1 has ceased, the back pressure valve 39 opens and there flows through the projection 40 and hollow axle 34 the hydrogen passing through the steel tube 32 of the stirrer, whereby any carbon still remaining on the inner wall of the cylinder 1 is entirely blown away. Whatever, therefore, has not been scraped off by the knife 31 is entirely removed by means of the hydrogen flowing through the tube 32. After the carbon has been thoroughly moved from the cylinder 1, in this manner the agitator is stopped, the valve 30 is closed and by opening the valve 23 the dividing cylinder is again filled for the purpose of another explosion. Through the heat caused by the explosion the dividing cylinder is always more and more heated. With a previous warming to 300° centigrade a mixture of 90% oil gas and 10% acetylene suffices in order to bring about the reaction. With a temperature of 350° to 380° centigrade only traces of acetylene are necessary to cause the explosion and pure oil gas can now be filled in. When therefore the apparatus is under the desired pressure about one-fifth of a liter of acetylene gas is pumped in through pipe 11 into the head 9 by means of a hand pump. In this manner there is provided in the hollow space of the head 9 an easily explosible mixture which suffices to bring about the reaction. In place of the acetylene one might also use another gas in the same manner. As has been shown by experiment a few cubic centimeters of air may be pumped in without danger. The pressure and the temperature must of course always be regulated according to the kind of gas which is being used, and in the case of a gas richer in carbon we can operate at considerably lower pressure and temperature than with a gas poorer in carbon. Moreover we are in the position to mix gases of different percentage of carbon without the use of acetylene gas at all. Through the different mixtures of the gases we are further in a position to make a softer or harder lamp black according to requirements. The hydrogen which was entered into the collector 2 is taken through the tube 53 into a receptacle which serves as a soot collector because small quantities of lamp black are carried along by the hydrogen. The hydrogen is then drawn off from the soot collector leaving the carbon behind.

In order to utilize the process for oil gas without acetylene or the like superheated steam under pressure and as hot as possible is introduced through the projection 5 and the dividing cylinder is heated in this manner. The cooled steam or the condensed water is drawn off through the part 6. After the apparatus is hereby heated up to about 150° centigrade, if we have a gas which does not decompose at this temperature under a pressure of about five atmospheres then the pressure must be so far increased that the decomposition can take place. The heat thereby liberated can then with aid of the steam soon bring the apparatus to a temperature at which the working under lower pressure becomes possible. The already indicated advantages with regard to the introduction of smaller quantities of acetylene or of air in the head 9 can also in this case find application in like manner.

When the collector 2 is filled with carbon, which of course only occurs after a whole series of explosions, the carbon is filled into delivery cask 45 in the manner already set forth. In this connection it must further be observed that the motion of the aforesaid pressure piston 49 can be effected either by hand or by machinery. As the piston finds itself in its lowermost position it closes the collector 2 tightly so that no hydrogen can escape. The access of air in the collector cannot occur because in consequence of the specific gravity between air and hydrogen only hydrogen can escape but no air can enter. By means of a corresponding device it is even possible to fill the casks with hydrogen or to drive out the air from them before the piston 49 is raised. For this purpose it suffices to make a little hole at the top and sidewise underneath in the cask 45 and to bring these holes into connection with hydrogen supply pipe so that the air is driven out of the casks from above downwards. This is, however, not of importance because the excess of hydrogen is always so great that an involuntary explosion can never take place. As long as the hydrogen is burned under the oil gas retorts (not shown) the air in the valves can safely be left, unexploded. Moreover, it is very improbable that an ignition in the apparatus or in the collector 2 can take place, because the lamp black is never delivered to it at such a temperature that it could ignite, which has been proved by experiment.

As we have mentioned above the use of steam, it should be stated that the steam necessary for the heating does not need to be produced by a special steam boiler arrangement, but it suffices if one or more apparatus (explosion apparatus) are heated, for example by exploding a mixture of about 80% acetylene and 20% oil gas, the jacket 4 being filled with water instead of with oil. Thus two apparatus can produce steam while one apparatus can superheat the freshly produced steam. Possibly an insulating steam collector might be brought into communication with the projections 5 and 6 so that each single apparatus may deliver dry steam.

In the foregoing there was naturally taken in view a production on large scale, particularly in saying that two or three apparatuses alone need be used for the production of steam or the heating of the dividing apparatus. The hydrogen gas rendered free by the decomposition of the hydrocarbon can be utilized as a by-product in the obtaining of ammonia by combining it with nitrogen. In this case the hydrogen is no longer used for supplying motors but a steam engine is employed because the steam for this can be produced free of expense by means of the aforesaid explosion apparatus. The liberated hydrogen can also be utilized again for the production of acetylene by saturating it with carbon.

Care of the whole apparatus can be effected from any point, it being not necessary that the workmen are placed in the same room, as the apparatus. The arrangement could also be so constructed as to work continuously so that the manipulation need not be effected by hand. This would be so arranged that the mechanisms to be actuated are so connected with one another by gearing, ratchet wheels and catches and so on, that they would be operated in the requisite order and alternately.

What I claim and desire to secure by Letters Patent is:—

1. The process of producing a carbon black which consists in heating a normally inexplosive hydrocarbon gas to a temperature at which such gas is susceptible of explosive decomposition in a closed chamber and causing a dissociative explosion throughout its mass.

2. The process of producing a carbon black which consists in heating a normally inexplosive hydrocarbon gas in a closed chamber under pressure to a temperature at which such gas is susceptible of explosive decomposition and causing a dissociative explosion throughout its mass.

3. The process of producing a carbon black which consists in heating a normally inexplosive hydrocarbon gas in admixture with a small proportion of a facilitating normally explosive body to a temperature at which such gas is susceptible of explosive decomposition in a closed chamber and causing a dissociative explosion throughout its mass.

4. The process of producing a carbon black which consists in heating a normally inexplosive hydrocarbon gas in admixture with a small proportion of acetylene to a temperature at which such gas is susceptible of explosive decomposition and causing a dissociative explosion throughout its mass.

5. The process of producing a carbon black which consists in heating oil gas in admixture with a small proportion of acetylene to a temperature at which such gas is susceptible of explosive decomposition and causing a dissociative explosion throughout its mass.

6. The process of producing a carbon black which consists in heating oil gas to a temperature at which such gas is susceptible of explosive decomposition and causing a dissociative explosion throughout its mass.

7. The process of producing a carbon black which consists in heating an explosion chamber by the dissociative explosion of a readily explosive hydrocarbon in admixture with a normally inexplosive hydrocarbon therein, and admixing successive charges with greater proportions of such normally inexplosive hydrocarbons as the temperature of the chamber increases.

8. The process of producing a carbon black which consists in heating an explosion chamber by the dissociative explosion of a readily explosive hydrocarbon in admixture with a normally inexplosive hydrocarbon therein, admixing successive charges with greater proportions of such normally inexplosive hydrocarbons as the temperature of the chamber increases and finally using charges composed mainly of such normally inexplosive hydrocarbons.

9. The process of producing a carbon black which consists in heating an explosion chamber by the dissociative explosion of a readily explosive hydrocarbon in admixture with a normally inexplosive hydrocarbon therein, admixing successive charges with greater proportions of such normally inexplosive hydrocarbons as the temperature of the chamber increases, and finally using charges composed mainly of such normally inexplosive hydrocarbons, assisting detonation by separate priming charges of such readily explosive hydrocarbons.

10. In the production of carbon black, the process which consists in the explosive dissociation of a normally inexplosive hydrocarbon by detonating the same by a relatively small proportion of a normally readily explosive hydrocarbon.

In testimony whereof I hereunto affix my signature in the presence of two witnesses.

JOSEF MACHTOLF.

Witnesses:
ADOLF LIBBERT,
ERNST ENTENMANN.